United States Patent [19]
Pollard

[11] Patent Number: 5,361,795
[45] Date of Patent: Nov. 8, 1994

[54] FURNACE WASTE WATER FREEZE PROTECTION METHOD

[76] Inventor: Albert C. Pollard, P.O. Box 266, Irvington, Va. 22480

[21] Appl. No.: 210,443

[22] Filed: Mar. 21, 1994

[51] Int. Cl.$^5$ .......................... E03B 7/12; F24H 3/02
[52] U.S. Cl. ........................................ 137/1; 110/193; 126/110 R; 137/59; 137/312; 137/403; 137/408; 141/86; 222/108; 237/80
[58] Field of Search ............... 110/193; 126/110 R, 126/116 R; 137/1, 59, 62, 188, 189, 403, 404, 408; 237/80; 141/86, 88; 222/108

[56] References Cited

U.S. PATENT DOCUMENTS

| | | | |
|---|---|---|---|
| Re. 12,125 | 6/1903 | Kennedy | 137/403 |
| 275,803 | 4/1883 | Collings et al. | 137/408 |
| 317,025 | 5/1885 | Scott | 137/408 |
| 645,751 | 3/1900 | Lewis | 137/408 |
| 1,012,633 | 12/1911 | Gruber | 137/408 |
| 2,708,435 | 5/1955 | Lewis | 137/408 |
| 2,845,057 | 7/1958 | Skerritt | 137/408 |
| 3,272,225 | 9/1966 | Frampton | 137/408 |
| 3,648,721 | 3/1972 | Skappel | 137/408 |
| 4,653,466 | 3/1987 | De Haan et al. | 126/116 R |
| 4,838,731 | 6/1989 | Gavin | 137/408 |

Primary Examiner—George L. Walton

[57] ABSTRACT

A method to prevent freezing of water in a conduit that carries the water out of a building. The method uses a device that alternately accumulates the water in a container and then dumps it. The water is then carried to the outside of the building through a conduit. The water, being released in batches, does not have time to freeze in the conduit.

3 Claims, 2 Drawing Sheets

FURNACE WASTE WATER FREEZE PROTECTION METHOD

BACKGROUND

Some heating systems generate very small quantities of waste water from combustion condensate and/or from humidifiers. It is common practice to get rid of this waste water by means of a drain pipe through the foundation wall of the building which has such a system. In some installations this drain pipe becomes plugged with ice frozen from the waste water. Current practice is the use of electrical heat tape on waste water pipes to prevent this freezing.

There are situations where the waste water is in a low location and a gravity drain cannot be used to carry the waste water away from the heating system. In these locations a pump is sometimes used to get rid of the water. In these installations water is released in batches or cycles. To the inventors knowledge, in these installations intended function of the pump is solely to lift the water.

BRIEF SUMMARY

Some heating systems generate waste water. Pipes are used to carry the waste water out of the building in which the heating system is installed. This invention is a process used to prevent freezing of the waste water in these pipes. The process uses an accumulator-discharge device that accumulates a quantity of the waste water and suddenly releases the water. When the waste water is suddenly released in this manner there is insufficient time for the water to freeze in the pipes. The process utilizes a container to accumulate a predetermined quantity of water. The container is pivotally mounted on a horizontal axis within a housing. The design is such that, as the container fills with water the center of gravity of the container with the water shifts until the weight of a predetermined amount of water causes the container to rotate on its pivot axis and dump the water into the housing. A drain pipe carries the water from the housing. After the water is discharged a restoring force rotates the container to its original position. The cycle is then repeated.

DETAILED DESCRIPTION

This invention is a process utilizing a prior art device for a new use. The new use is to prevent freezing of furnace waste water in pipes that carry this water out of the building in which the furnace is installed. It is common practice to extend these pipes through the foundation wall of the building in which the heating system is installed. Water is discharged through these pipes at a very slow rate. If the waste water freezes in the pipe, the frozen water plugs the pipe preventing the discharge of subsequent waste water.

The process involves the following: a) using a pipe size that is larger by several fold than the minimum to carry the waste water, b) using a pipe material with low specific heat and low thermal conductivity, and c) accumulating a quantity of waste water inside the building and suddenly releasing it. Such quantity must be sufficient so that the total available heat in the water before it freezes is greater than the actual amount of heat given up to the thermal mass of the pipe and to the environment through the walls of the pipe. In summary, the process is to use a short length of large plastic pipe and release the water in "batches".

The key elements of this invention are not only the recognition that the freeze problems can be avoided by releasing the water in batches, but also the recognition that a very simple prior art device can accomplish this purpose. Early efforts by the inventor were to adapt a mechanism similar to the mechanism in a toilet tank to perform the function of releasing water in batches. These efforts were abandoned because of the difficulty in providing a reliable water tight seal in the release mechanism.

Figure 2:
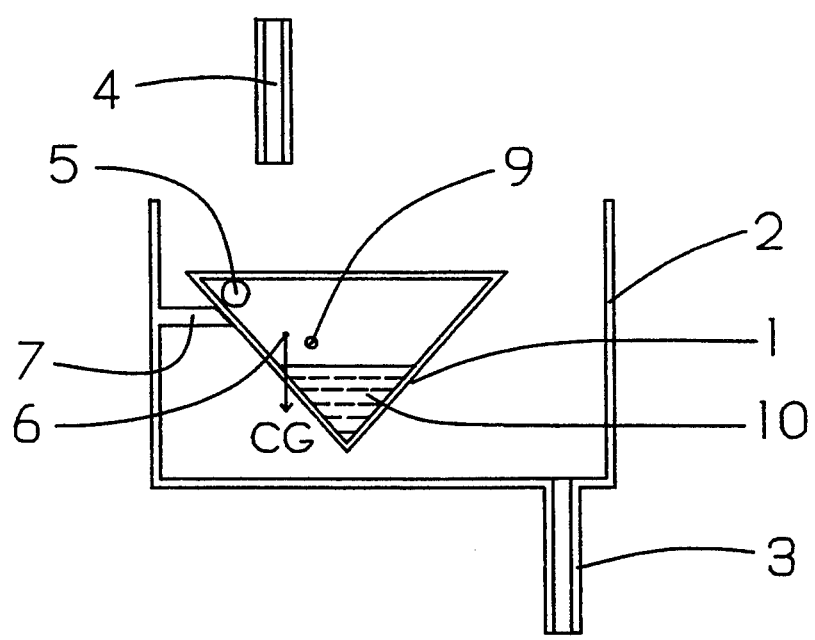
FIG. 2 shows a section through the preferred embodiment of the accumulator/discharge device with the accumulator container in the accumulating position.

FIG. 2 illustrates a section view through the side of the preferred embodiment of the device used to release the waste water in batches. Referring to FIG. 2, container 1 is pivotally mounted in housing 2 at pivot axis 9. Weight 5, which is part of container 1, coupled with the weight of the rest of container 1 causes a combined center of gravity 6 to act at the location of center of gravity 6. The center of gravity 6 when container 1 is empty causes the container to be rotated against stop 7. Water enters through inlet port 4 and is accumulated in container 1. The center of gravity of the accumulated water 10 is to the right of pivot axis 9. When a quantity of water is accumulated sufficient to cause the combined center of gravity of the water 10 and the container 1 to move the right of pivot axis 9, the container 1 then rotates clockwise around pivot axis 9 to the discharge position shown in FIG. 3. When the container 1 is in the discharge position illustrated in FIG. 3, most or all of the water is dumped into the housing 2 and is discharged through drain port 3. The container 1, now being empty or nearly empty, rotates counterclockwise due to the action of the center of gravity 6 on the left of the pivot axis 9. The container 1 is now back to the position illustrated in FIG. 2 and the process is repeated.

Figure 3:
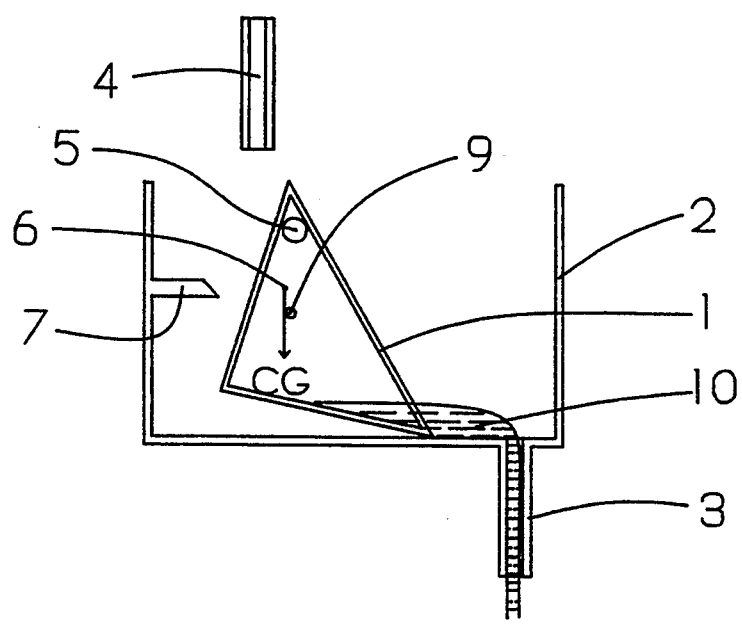
FIG. 3 shown section through the preferred embodiment of the accumulator/discharge device with the accumulator container in the discharged position.

Note that the restoring force to rotate the container 1 to the position illustrated in FIG. 3 is by means of the action of the center of gravity 6. This restoring force could be by means of a spring. A linear spring could act where the center of gravity 6 is illustrated or a spring could apply counterclockwise torque at pivot axis 9. A spring was not chosen for the restoring force because a spring is subject to corrosion and a spring is not as simple as the arrangement illustrated.

Figure 4:
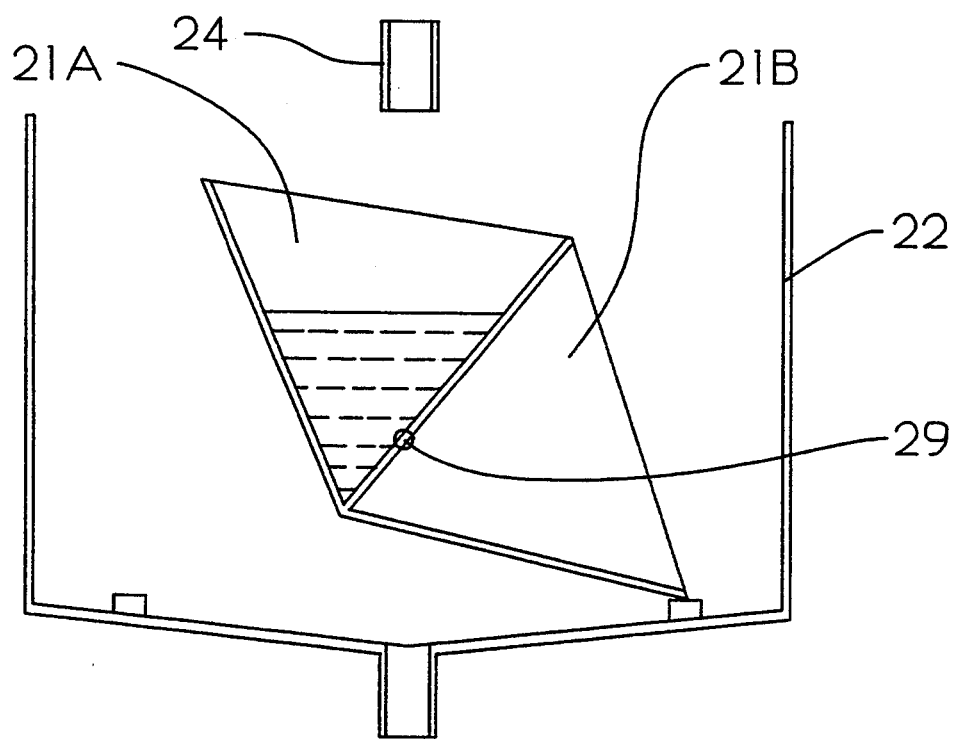
FIG. 4 shows an alternate design for a accumulator/discharge device.

FIG. 4 illustrates a device similar to the device illustrated in FIGS. 2 and 3, however it has two containers, 21A and 21B pivotally supported by housing 22 at pivot axis 29. In this device the containers 21A and 21B are alternately filled with water entering through inlet port 24. As illustrated in FIG. 4, when container 21A fills with a sufficient quantity of water, the weight of the water will cause the containers to rotate counterclockwise emptying container 21A and allowing container 21B, now under inlet pipe 24, to fill sufficiently to cause the containers 21A and 21B to rotate back to the position illustrated. The process is then repeated.

MODE OF OPERATION OF INVENTION

Figure 1:
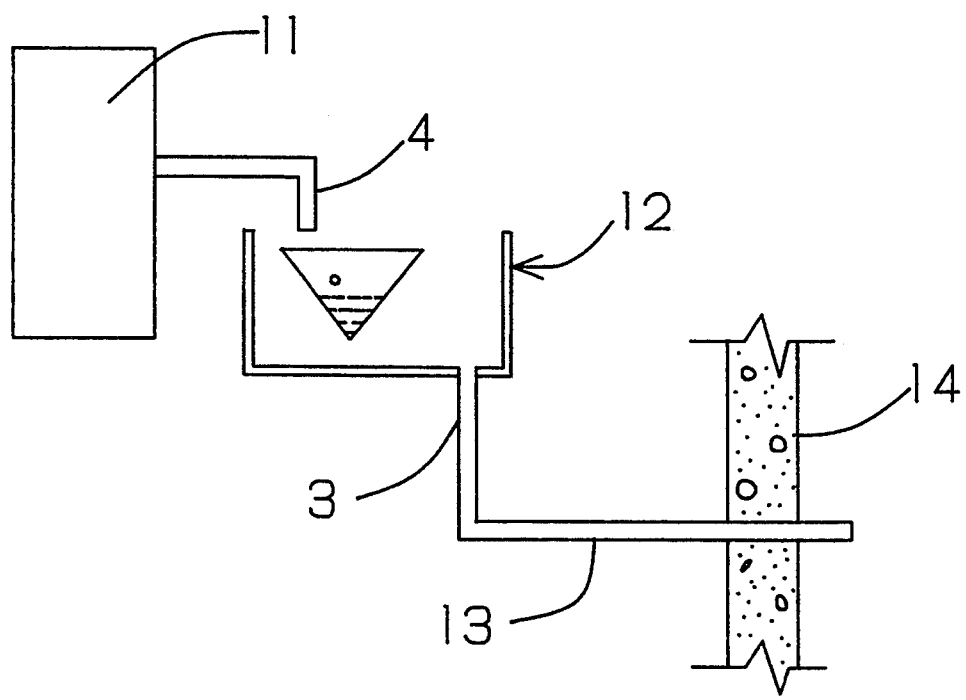
FIG. 1 illustrates the process using an accumulator/discharge device in a heating system.

The preferred mode of operation of this invention is illustrated in FIG. 1. This mode utilizes a accumulator/-discharge device 12 as illustrated in FIGS. 2 and 3 in the following manner: Waste water from a heating system 11 is discharge into inlet port 4 of the accumulator/discharge device 12. This device is designed to discharge water after accumulating approximately a pint of water. Waste water from drain port 3 is carried by means of pipe 13 to the outside of the building wall 14 of the building in which the heating system is installed. Pipe 13 is large compared to the minimum size necessary to carry the water, that is ½" or larger. Pipe 13 is also plastic pipe, as opposed to a metal pipe such as copper.

CONCLUSIONS, RAMIFICATIONS AND SCOPE

As the reader can see, this inventor has devised an effective method of preventing furnace waste water from freezing and the resulting plugging of drain pipes. In the appended claims an effort has been made to use word choices to cover the entire spirit of the invention. The word "conduit" has been used to include hoses and similar devices as well as pipes. When the accumulating container discharges water it is not necessary for it to empty completely, and thus the claims wording reflects this. There is the possibility that a clever attempt to avoid infringement could avoid the strictest interpretation of the words chosen, therefore the claims should be interpreted against the background of this specification and the spirit of the invention as set forth herein.

I claim:

1. A method to prevent freezing of waste water from a heating system in a conduit that carries waste water out of a building from a heating system, said method comprised of the following steps:
    a) processing said waste water from said heating system to an accumulator-discharge device comprised of:
        an inlet port in communication with said heating system and being disposed above
        a container supported on
        a horizontal pivot axis in
        a housing having
        a discharge port and
        a stop,
    wherein said container, when empty, is maintained in an upright receiving position by action of gravity on a center of gravity of said container, urging said container around said pivot axis against said stop,
    said container, in said upright receiving position, accumulates said waste water from said heating system through said inlet port and into said container, the center of gravity of the accumulation of said waste water, being within said container disposed on one side of said pivot axis and said center of gravity of said container being disposed on the other side of said pivot axis, rotates said container about said pivot axis to a discharge position,
    said container in said discharge position, discharges substantially all of said accumulated waste water within said container into said housing,
    said weight of said container, overcoming the weight of any remaining said accumulated waste water, rotates said container about said pivot axis to said receiving position,
    said discharged waste water in said housing, flows out of said discharge port,
    b) and carrying said discharged waste water from said discharge port by means of said conduit to outside of said building to prevent freezing of said waste water in said conduit.

2. A method to prevent freezing of waste water system in a conduit that carries said waste water out of a building from a heating system, said method comprised of the following steps:
    a) processing said waste water from said heating system to an accumulator-discharge device comprised of:
        an inlet port in communication with said heating system and being disposed above
        a container supported on
        a horizontal pivot axis in
        a housing having
        a discharge port and
        a stop,
        a spring acting between said container and said housing
    wherein said container, when empty, is maintained in an upright receiving position by action of said spring urging said container around said pivot axis against said stop,
    said container, in said upright receiving position, accumulates said waste water from said heating system through said inlet port and into said container, said waste water the center of gravity of the accumulation of within said container overcomes an action of said spring, rotates said container about said pivot axis to a discharge position,
    said container in said discharge position, discharges substantially said accumulated waste water within said container into said housing,
    said spring overcoming the weight of any remaining said accumulated waste water, rotates said container about said pivot axis to said receiving position,
    said discharged waste water in said housing flows out of said discharge port,
    b) and carrying said discharged waste water from said discharge port by means of said conduit to outside of said building to prevent freezing of said waste water in said conduit.

3. A method to prevent freezing of waste water from a heating system in a building where a conduit carries said waste water out of said building, said method comprised of the following steps:
    a) processing said waste water from said heating system to an accumulator-discharge device comprised of:
        an inlet port in communication with said heating system and being disposed above
        a two compartment container supported on
        a horizontal pivot axis in
        a housing having
        a discharge port,
    wherein said two compartment container is maintained in a position such that a first compartment is in a receiving position under said inlet port and a second compartment is in a discharge position by an action of gravity urging said two compartment container around said pivot axis to a first position,
    said first compartment container, in said receiving position, accumulates said waste water from said heating system through said inlet port and into said first compartment, the center of gravity of the accumulation said waste water within said first compartment container, being disposed on one side of said pivot axis from a first center of gravity of first compartment container, rotates said two compartment container about said pivot axis to a second position, said two compartment container in said second position, discharges substantially all of said accumulated waste water from said first compartment, and said second compartment, now in a receiving position, accumulates said waste water from said inlet port and into said second compartment container, the center of gravity of the accumulation of said waste water therein, being disposed on one side of said pivot axis from a second center of gravity of said two compartment container, rotates said two compartment container about said pivot axis back to said first position, said discharged waste water in said housing, flows out of said discharge port, b) and carrying said discharged wastes water from said outlet port by means of said conduit to outside of said building to prevent freezing of said waste water in said conduit.

* * * * *